US012478536B2

(12) United States Patent
Struewing

(10) Patent No.: US 12,478,536 B2
(45) Date of Patent: Nov. 25, 2025

(54) MECHANISM FOR THE BED OF A CASKET

(71) Applicant: Batesville Services, LLC, Batesville, IN (US)

(72) Inventor: Christopher Carl Struewing, Batesville, IN (US)

(73) Assignee: Batesville Services, LLC, Batesville, IN (US)

( * ) Notice: Subject to any disclaimer, the term of this patent is extended or adjusted under 35 U.S.C. 154(b) by 18 days.

(21) Appl. No.: 18/536,978

(22) Filed: Dec. 12, 2023

(65) Prior Publication Data

US 2024/0189172 A1 Jun. 13, 2024

Related U.S. Application Data

(60) Provisional application No. 63/387,159, filed on Dec. 13, 2022.

(51) Int. Cl.
*A61G 17/04* (2006.01)
*A61G 17/00* (2006.01)

(52) U.S. Cl.
CPC .......... *A61G 17/044* (2016.11); *A61G 17/004* (2016.11)

(58) Field of Classification Search
CPC .. A61G 17/044; A61G 17/004; A61G 17/007; A61G 17/0136
USPC .............................................................. 27/12
See application file for complete search history.

(56) References Cited

U.S. PATENT DOCUMENTS 611,880 A * 10/1898 Whitcomb et al. .. A61G 17/044 27/13
2,670,517 A * 3/1954 Hillenbrand ......... A61G 17/044 27/12
2,839,814 A * 6/1958 Harter .................. A61G 17/044 27/12
2,888,732 A * 6/1959 Nelson ................. A61G 17/044 27/12
3,041,704 A * 7/1962 Gruber ................. A61G 17/044 27/12
3,653,104 A * 4/1972 Nelson ................. A61G 17/044 27/12
3,692,267 A * 9/1972 Kronas ................ A47C 20/042 27/12
4,070,737 A * 1/1978 Peterson .............. A61G 17/044 27/12
4,332,064 A * 6/1982 Foust ................... A61G 17/044 27/12
4,403,380 A * 9/1983 Hazelett ............... A61G 17/044 27/12
4,404,716 A * 9/1983 Foust ................... A61G 17/044 27/12
4,524,472 A * 6/1985 Foust ................... A61G 17/044 248/188.4
4,621,395 A * 11/1986 Benoit ................. A61G 17/044 403/399
4,993,129 A * 2/1991 Underwood ......... A61G 17/044 27/12
5,231,741 A * 8/1993 Maguire .............. A61G 17/044 27/12
5,592,724 A 1/1997 Linville et al.
(Continued)

*Primary Examiner* — William L Miller
(74) *Attorney, Agent, or Firm* — Dinsmore & Shohl LLP

(57) ABSTRACT

A casket comprising a mechanism for changing an elevation of a bed of the casket, the mechanism including a first rod, a second rod, and a planar member, the first rod, the second rod, and the planar member are all made of combustible material.

8 Claims, 12 Drawing Sheets

(56) References Cited

U.S. PATENT DOCUMENTS

| | | | | |
|---|---|---|---|---|
| 6,301,758 | B1 * | 10/2001 | Biondo | A61G 17/0076 27/12 |
| 7,904,999 | B2 * | 3/2011 | Steinhaus | A61G 17/004 27/35 |
| 9,597,248 | B2 * | 3/2017 | Davis | A61G 17/044 |
| 2009/0031931 | A1 * | 2/2009 | Steinhaus | A61G 17/044 27/12 |
| 2012/0047700 | A1 * | 3/2012 | Kelly | A61G 17/044 27/21.1 |

* cited by examiner

MECHANISM FOR THE BED OF A CASKET

CROSS-REFERENCE TO RELATED APPLICATIONS

This application claims the benefit of U.S. Provisional Patent Application No. 63/387,159, filed on Dec. 13, 2022 and entitled A Mechanism for the Bed of a Casket, the entire contents of which are hereby incorporated by reference.

TECHNICAL FIELD

The present application relates generally to caskets and in particular to a mechanism for raising and lowering the bed of a casket.

BACKGROUND

Prior to cremating a deceased in a casket, it is preferable to remove as many components as possible, from the casket, that are made of non-combustible materials, such as metal. Consequently, it is desirable to reduce the number of components in a casket that are made of non-combustible materials.

BRIEF SUMMARY

An aspect of the present application provides a casket comprising: a container comprising four walls and a floor attached to the four walls together defining an interior, the four walls including a first end wall, a second end wall positioned opposite the first end wall, a first side wall and a second side wall positioned opposite the first side wall; a mechanism, positioned in the interior, coupled to the first end wall, the mechanism including a first rod, a second rod, and a planar member, the first rod and second rod defining a plane substantially parallel to the first end wall, the planar member defining a first bore and a second bore, the first rod is slidably received in the first bore, the second bore is internally threaded, the second rod is externally threaded, the second rod is threadably received in the second bore, such that rotating the second rod about a lengthwise axis of the second rod changes an elevation of the planar member relative to the floor, wherein, the first rod, the second rod, and the planar member are made of a combustible material.

The mechanism can comprise a first member coupled to the first end wall at a first elevation from the floor and a second member coupled to the first end wall at a second elevation from the floor, the first rod and the second rod coupled to the first member and the second member, the planar member displaceable between the first member and the second member by rotating the second rod about the lengthwise axis of the second rod.

The thread on the second rod can be ACME thread.

The first rod can be made of fiberglass.

The second rod can be made of glass filled nylon.

The planar member can be made of polyoxymethylene.

The casket can comprise another mechanism, positioned in the interior, coupled to the second end wall, the another mechanism including a third rod, a fourth rod, and a second planar member, the third rod and fourth rod defining a plane substantially parallel to the second end wall, the second planar member defining a third bore and a fourth bore, the third rod is slidably received in the third bore, the fourth bore is internally threaded, the fourth rod is externally threaded, the fourth rod is threadably received in the fourth bore, such that rotating the fourth rod about a lengthwise axis of the fourth rod changes an elevation of the second planar member relative to the floor, wherein, the third rod, the fourth rod, and the second planar member are made of a combustible material, and wherein the second mechanism comprises a third member coupled to the end wall at a third elevation from the floor and a fourth member coupled to the second end wall at a fourth elevation from the floor, the third rod and the fourth rod coupled to the third member and the fourth member, the second planar member displaceable between the third member and the fourth member by rotating the fourth rod about a lengthwise axis of the fourth rod.

The thread on the fourth rod can be ACME thread, the third rod can be made of fiberglass, the fourth rod can be made of glass filled nylon, and the second planar member can be made of polyoxymethylene.

The casket can comprise a bed for supporting a deceased, the first planar member and the second planar member fastened to the bed, the bed located at an elevation fixed to the elevation of the first planar member and second planar member.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Specific embodiments of the present application are now described with reference to the figures. The following detailed description is merely exemplary in nature and is not intended to limit the concepts and uses of the concepts. Furthermore, there is no intention to be restricted by any expressed or implied theory in the present application. In the description, head board is used with reference to the board located at the end adjacent, when positioned in the casket, a deceased s head and foot board is used with reference to the board located at the end opposite that of the head board.

Figure 1:
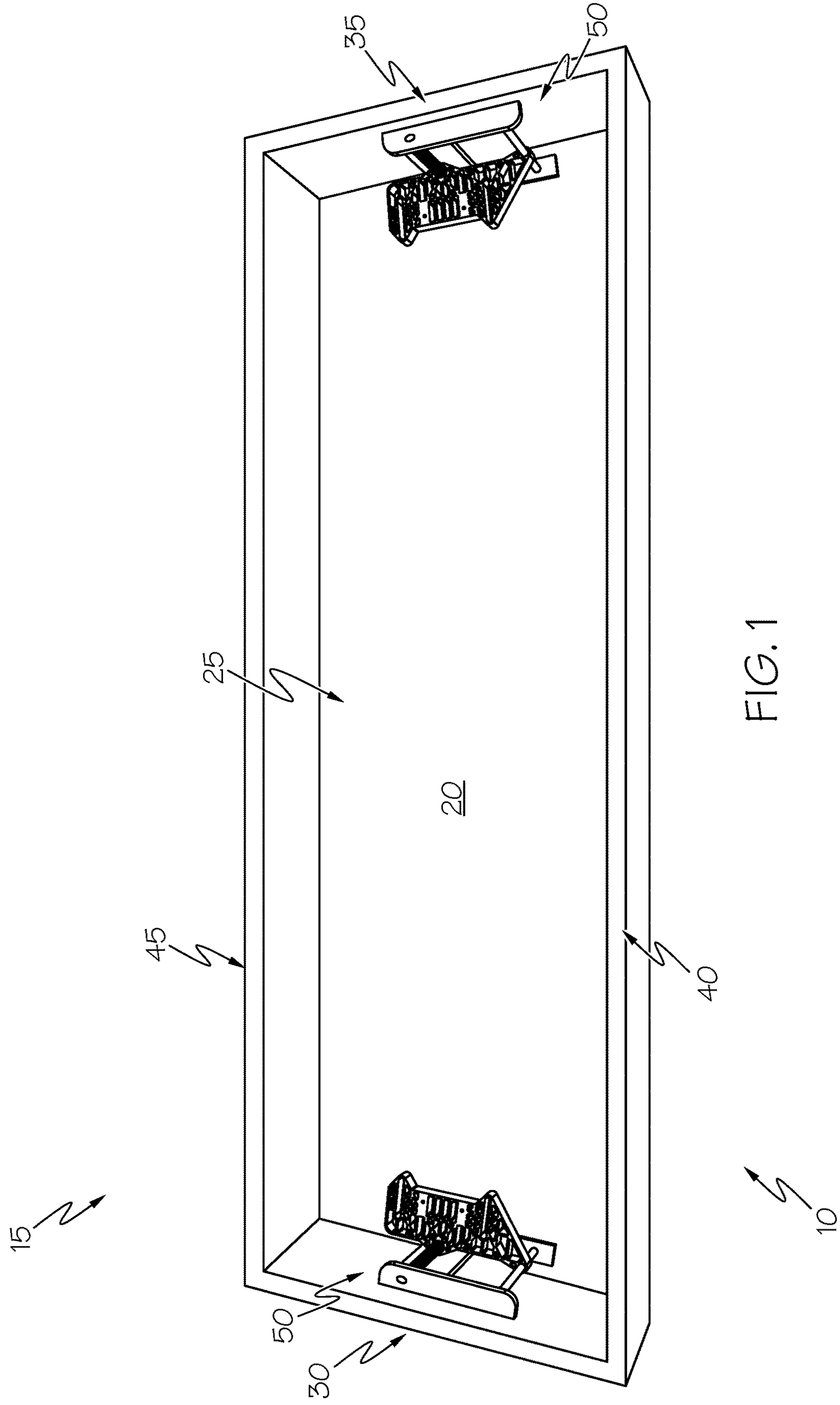
FIG. 1 is a top perspective view of a casket in accordance to an embodiment of the present application.

FIG. 1 is a perspective view of a casket 10 comprising four walls 15 and a floor 20 attached to four walls 15 together defining an interior 25, four walls 15 comprises a first end wall 30, a second end wall 35 positioned opposite first end wall 30, a first side wall 40 and a second side wall 45 positioned opposite first side wall 40. Casket 10 comprises a mechanism 50, positioned in interior 25, coupled to first end wall 30. Mechanism 50 is for raising or lowering a bed 52 of casket 10 (see FIG. 5).

Figure 2:
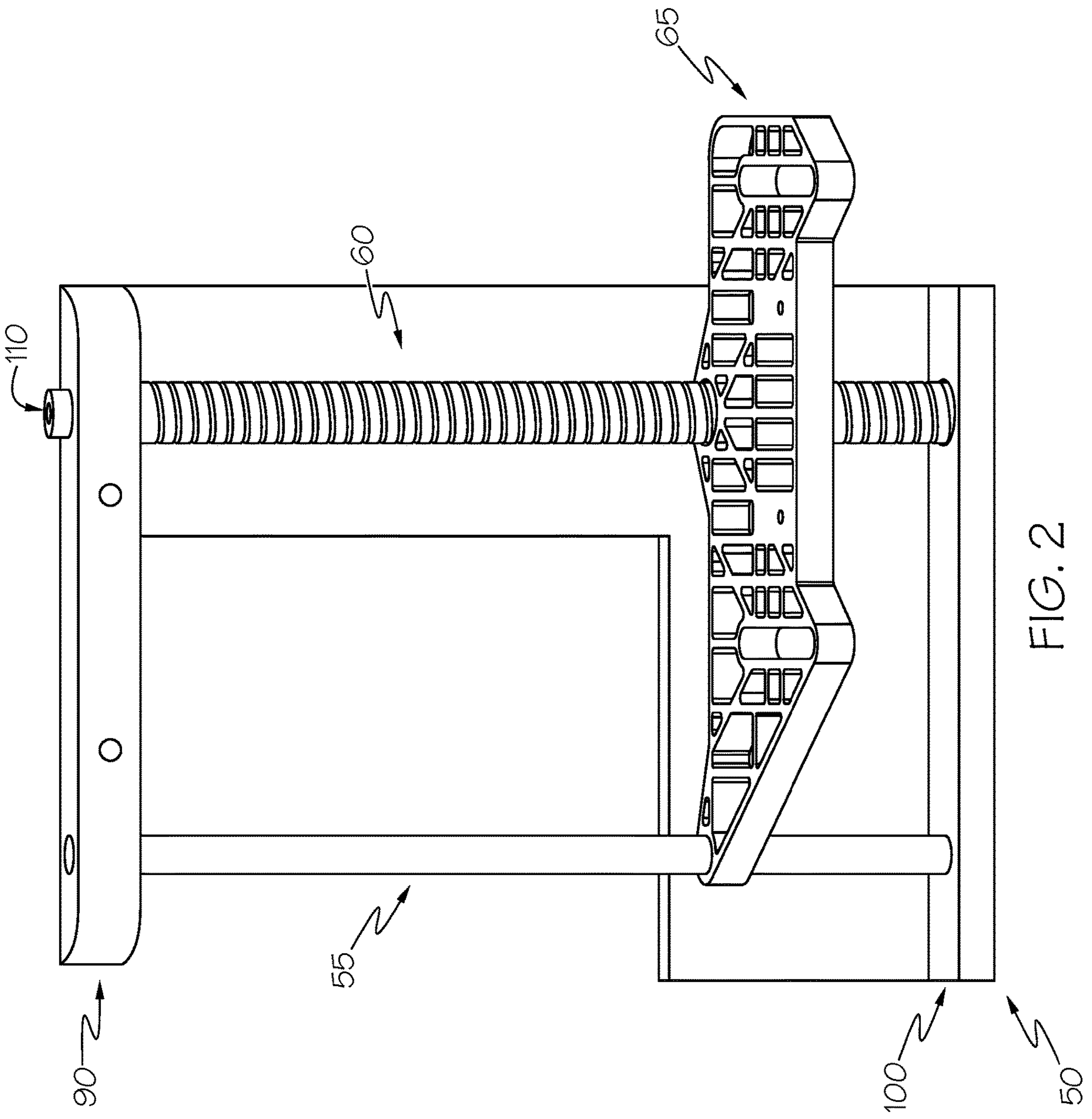
FIG. 2 is a top perspective view of a mechanism of the casket of FIG. 1.

Referring to FIG. 2, mechanism 50 comprises a first rod 55, a second rod 60, and a planar member 65. First rod 55 and second rod 60 define a plane substantially parallel to first end wall 30. Rods 55, 60 are substantially perpendicular to floor 20 at least at the location where rods 55, 60 are positioned. Planar member defines a first bore 70 and a second bore 75 (see FIG. 6). First rod 55 is slidably received in first bore 70. Second bore 75 is internally threaded and second rod 60 is externally threaded. Second rod 60 is threadably received in second bore 75, such that rotating second rod 60 about a lengthwise axis 80 of the second rod 60 (see FIG. 3) changes an elevation 85 of the planar member relative to floor 20. In the illustrated embodiments, first rod 55, second rod 60, and planar member 65 are made of a combustible material. First rod 55 is made of fiberglass. Second rod 60 is made of glass filled nylon and the thread on second rod 60 is ACME thread. Planar member 65 is made of polyoxymethylene, sold under the trademark Delrin® by Dupont.

Figure 4:
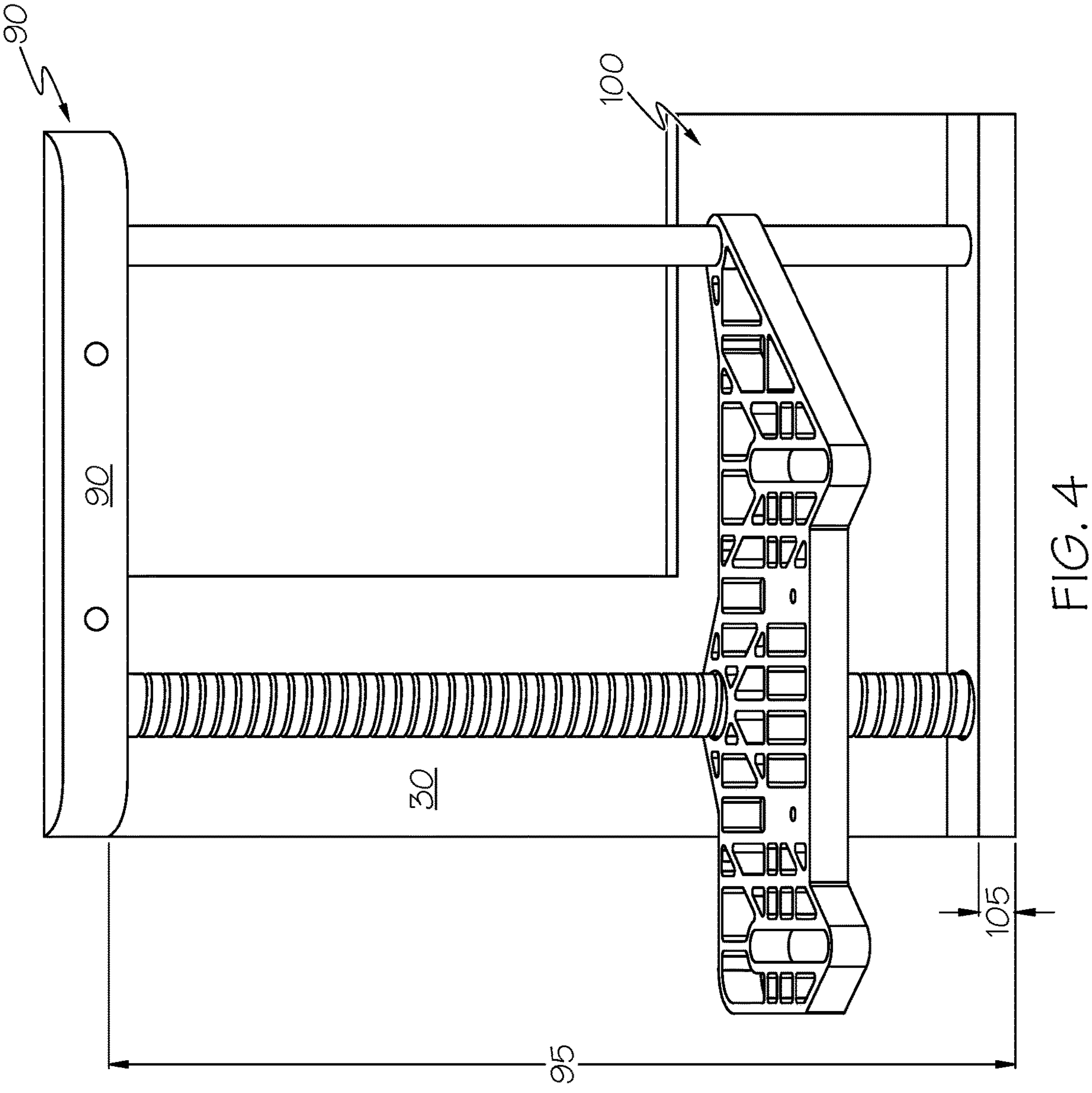
FIG. 4 is a top perspective view of the mechanism of the casket of FIG. 2 installed in a casket.

Referring to FIG. 4, mechanism 50 comprises a first member 90 coupled to first end wall 30 at an elevation 95 from floor 20 and a second member 100 coupled to first end wall 30 at an elevation 105 from floor 20. In the illustrated embodiment, first member 90 and second member 100 are made of combustible material such as wood. First rod 55 and second rod 60 is coupled to first member 90 and second member 100. Planar member 65 is displaceable in a direction 102 (see FIG. 8), substantially parallel to the plane defined by first rod 55 and second rod 60, between first member 90 and second member 100 by rotating, via a hex tool (not shown) inserted into hex opening 110 (see FIG. 2), second rod 60 about lengthwise axis 80 of second rod 60.

Figure 5:
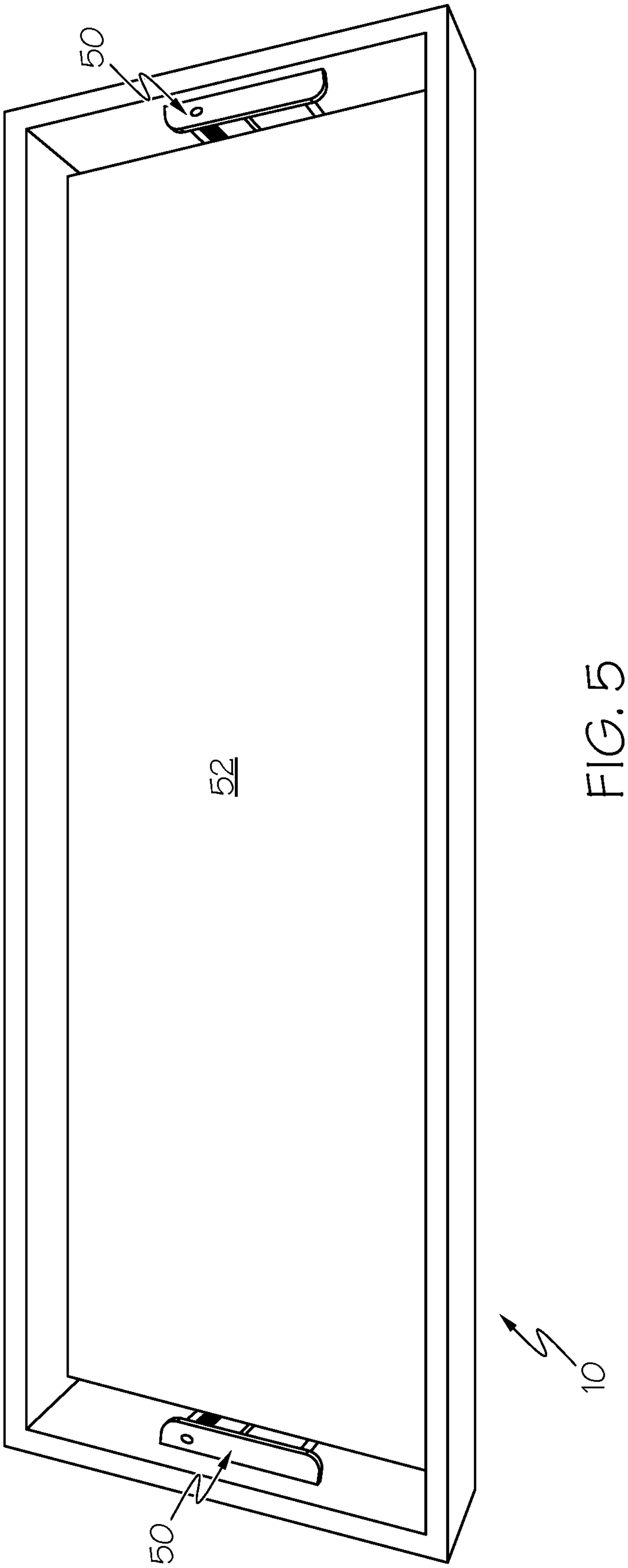
FIG. 5 is a top perspective view of a casket in accordance to an embodiment of FIG. 1 with the bed installed.

Referring to FIG. 5, casket 10 comprises bed 52 for supporting a deceased (not shown), planar member 65 is fastened to bed 52 via for example bolts 125 and screws. Bed 52 is located at an elevation in a fixed relation to elevation 85 of planar member 65.

Figure 6:
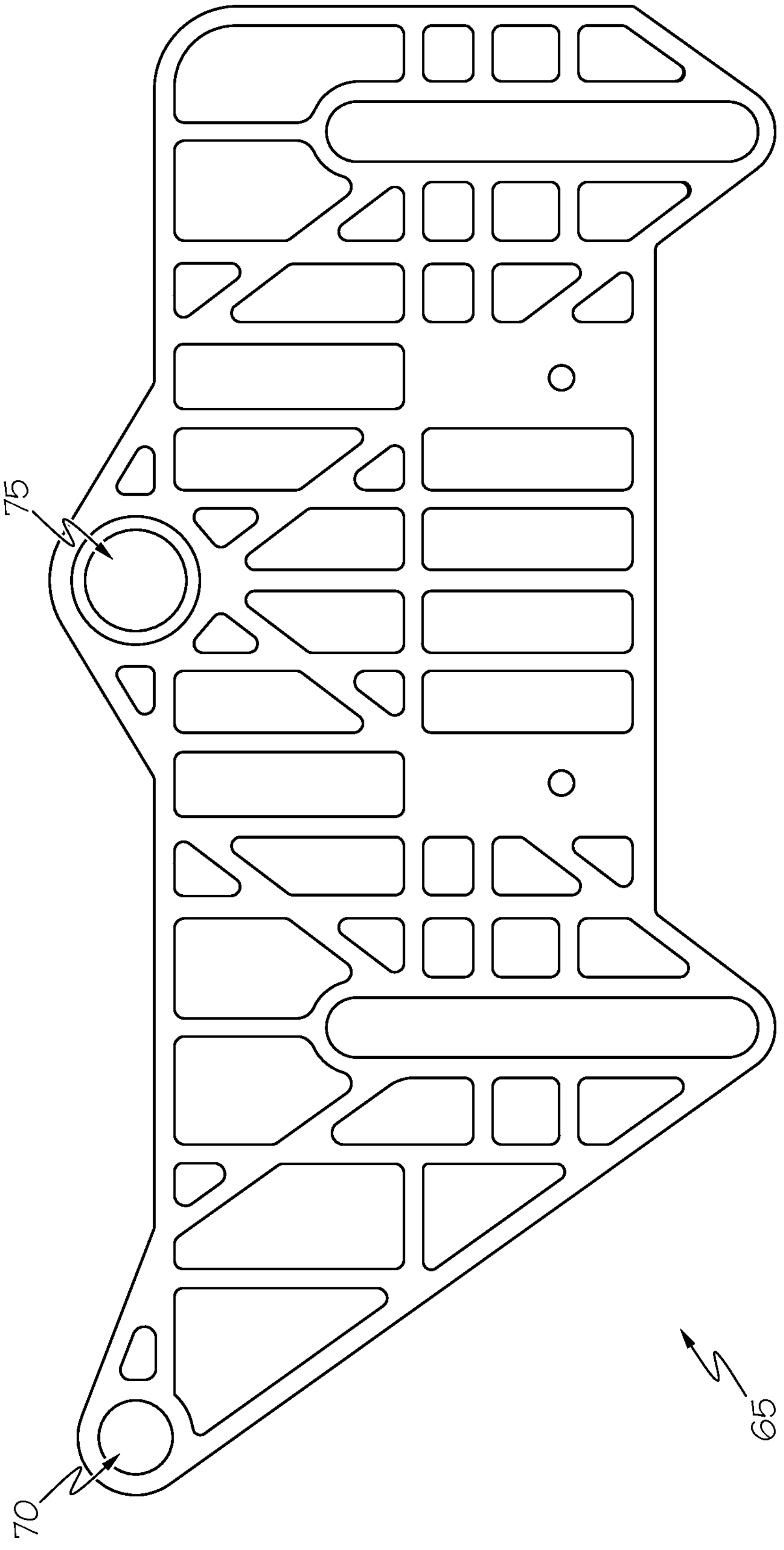
FIG. 6 is a top view of the planar member of the mechanism of FIG. 2.
Figure 7:
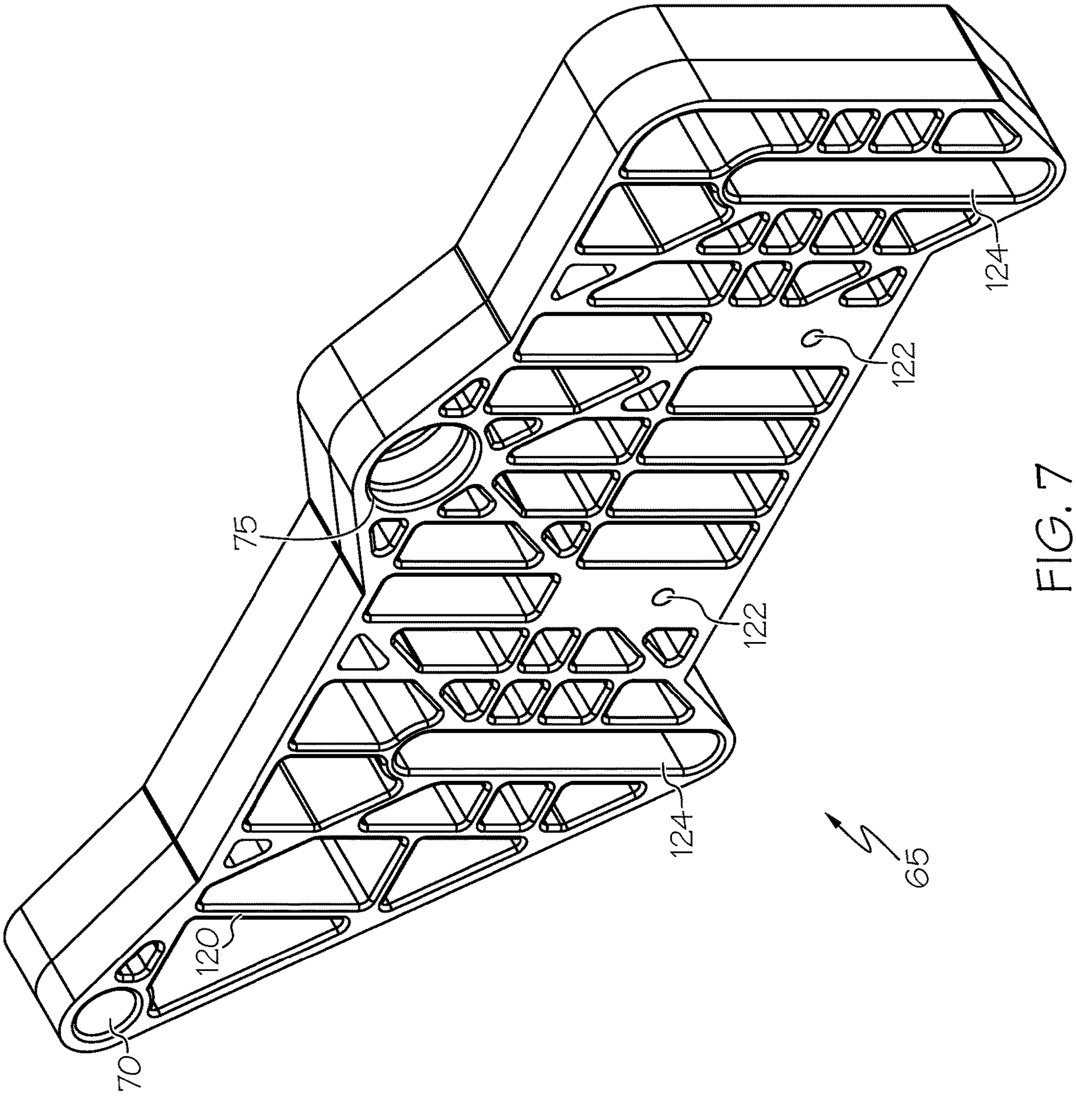
FIG. 7 is a perspective view of the planar member of FIG. 6.
Figure 8:
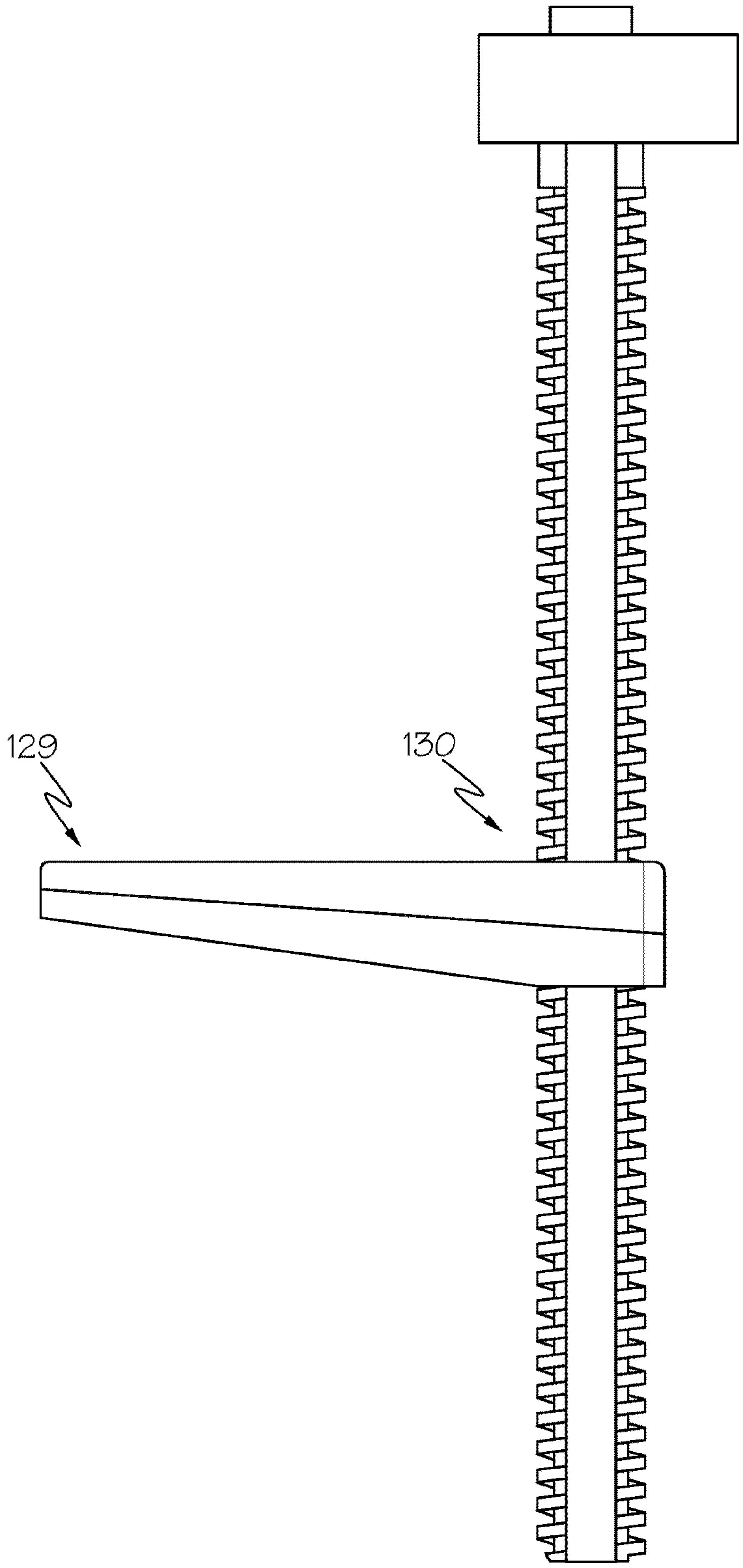
FIG. 8 is a side view of the mechanism of FIG. 2.
Figure 9:
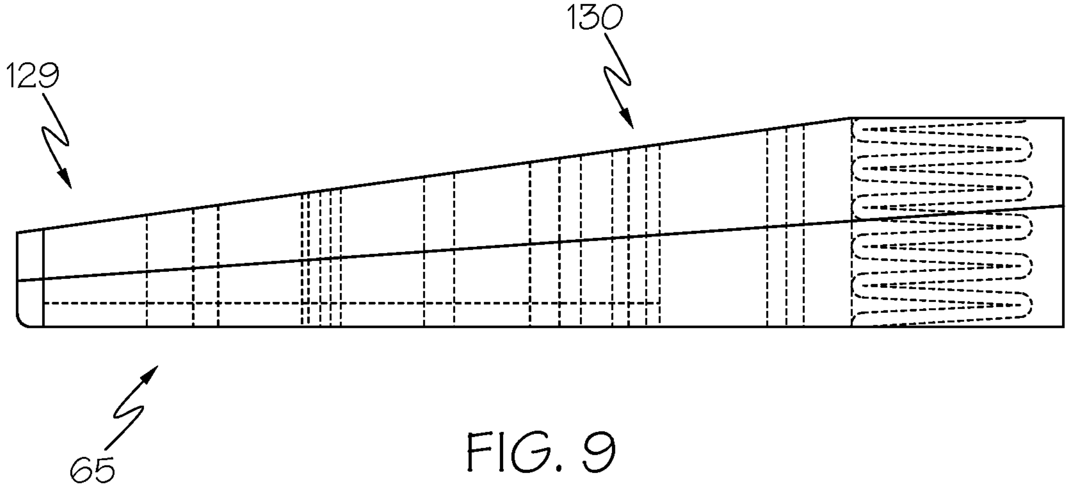
FIG. 9 is a sectional view of the planar member of FIG. 2.
Figure 12:
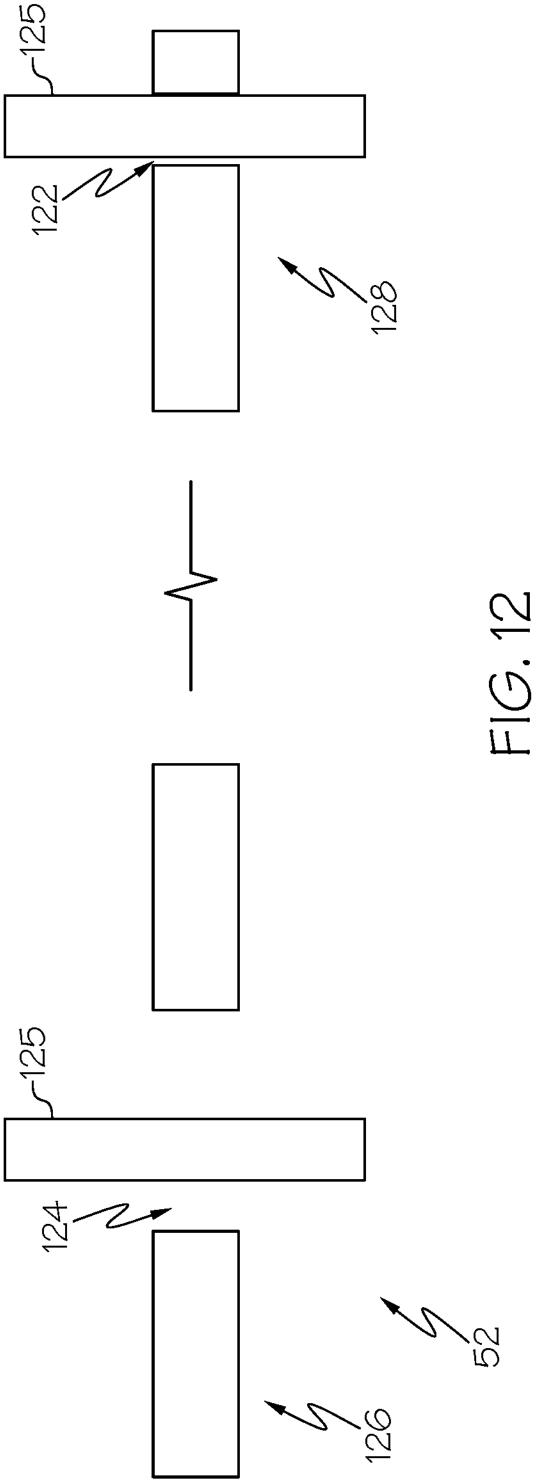
FIG. 12 is a schematic of a sectional view of the bed FIG. 5.

Referring to FIGS. 6 and 7, planar member 65 comprises a web of structural ribs 120, holes 122, and slots 124. Holes 122 and slots 124 are for receiving a fastener such as a bolt 125 to fasten planar member 65 to bed 52. In some embodiments, one end of bed 52 is fastened to planar member 65 via holes 122 while the other end is fastened via slots 124. Fastening one end of bed 52 via slots 124 allows lengthwise displacement of that end of bed 52 relative to planar member 65. Fastening one end of bed 52 via holes 122 restricts lengthwise displacement of that end of bed 52 relative to planar member 65. FIG. 12 is a schematic of a sectioned view of bed 52 showing one end 126 of bed 52 fastened to bed 52 via slots 124 and an end 128 of bed 52 fastened to bed 52 via holes 122. Referring to FIGS. 8 and 9, planar member 65 may have a tapered side profile with the thin end at an end 129 opposite the thick end at an end 130 where bores 70, 75 are located.

Figure 3:
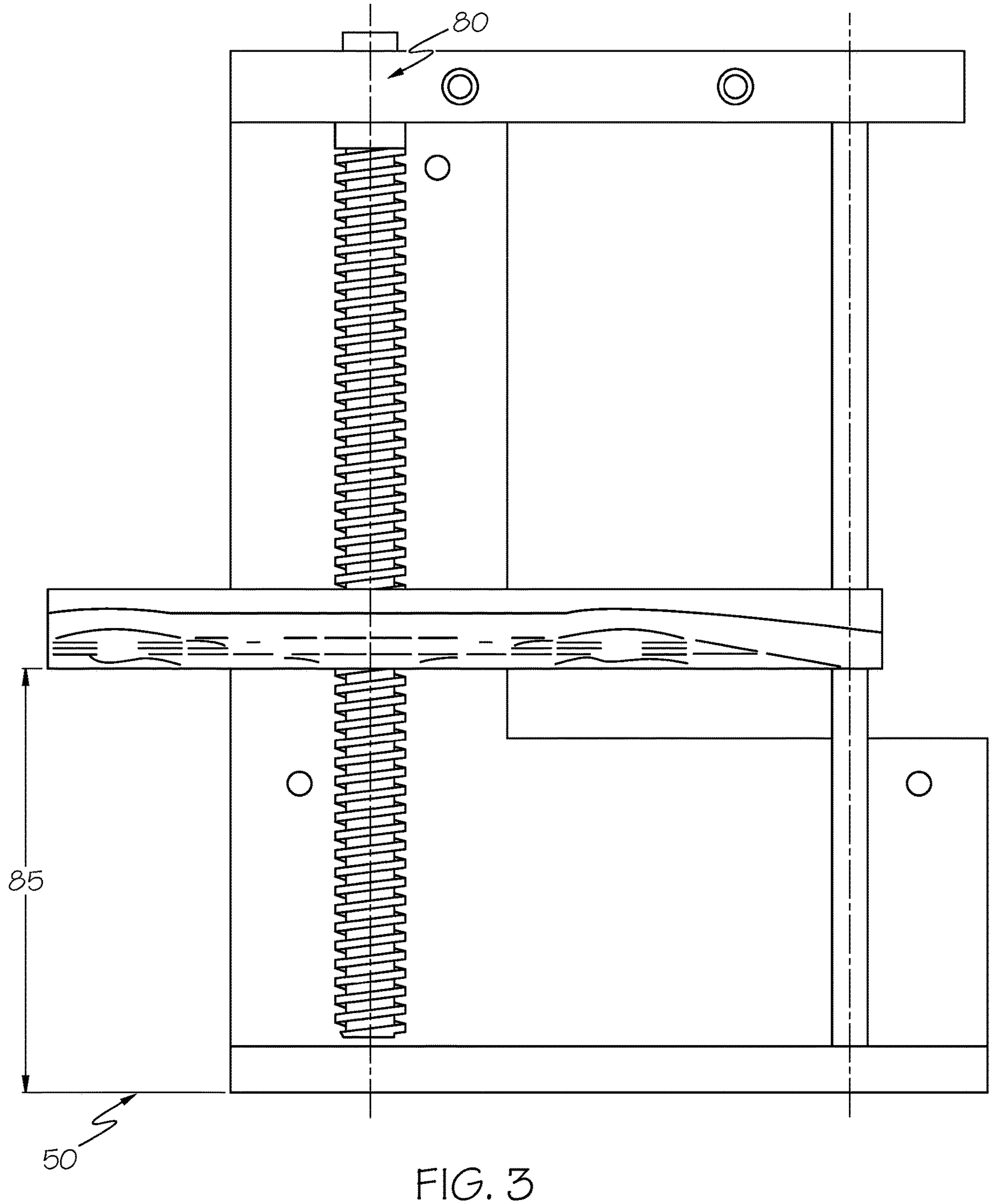
FIG. 3 is a front view of the mechanism of FIG. 2.
Figure 10:
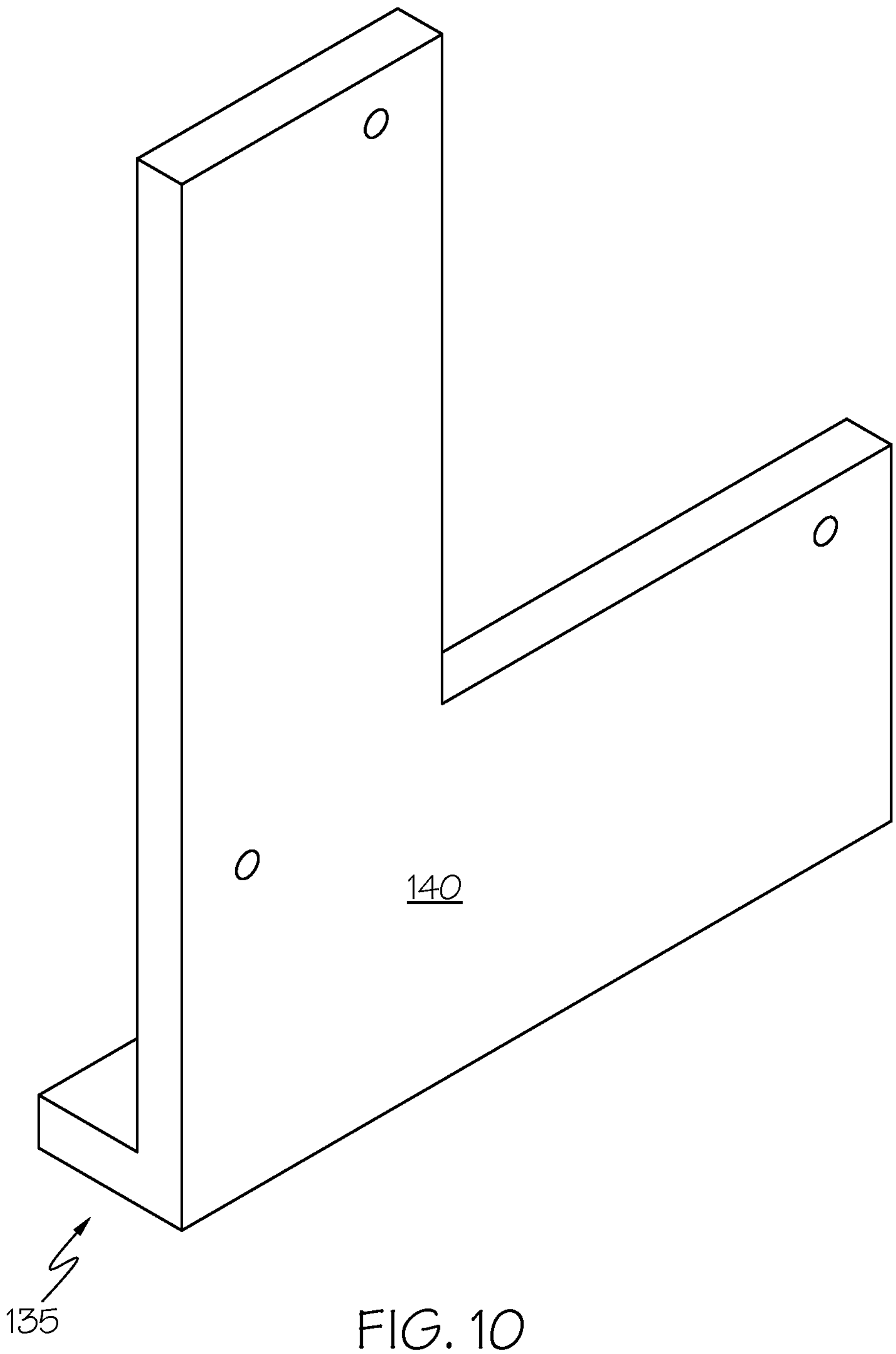
FIG. 10 is a rear perspective view of a member of the mechanism of FIG. 1 according to an embodiment of the present application.
Figure 11:
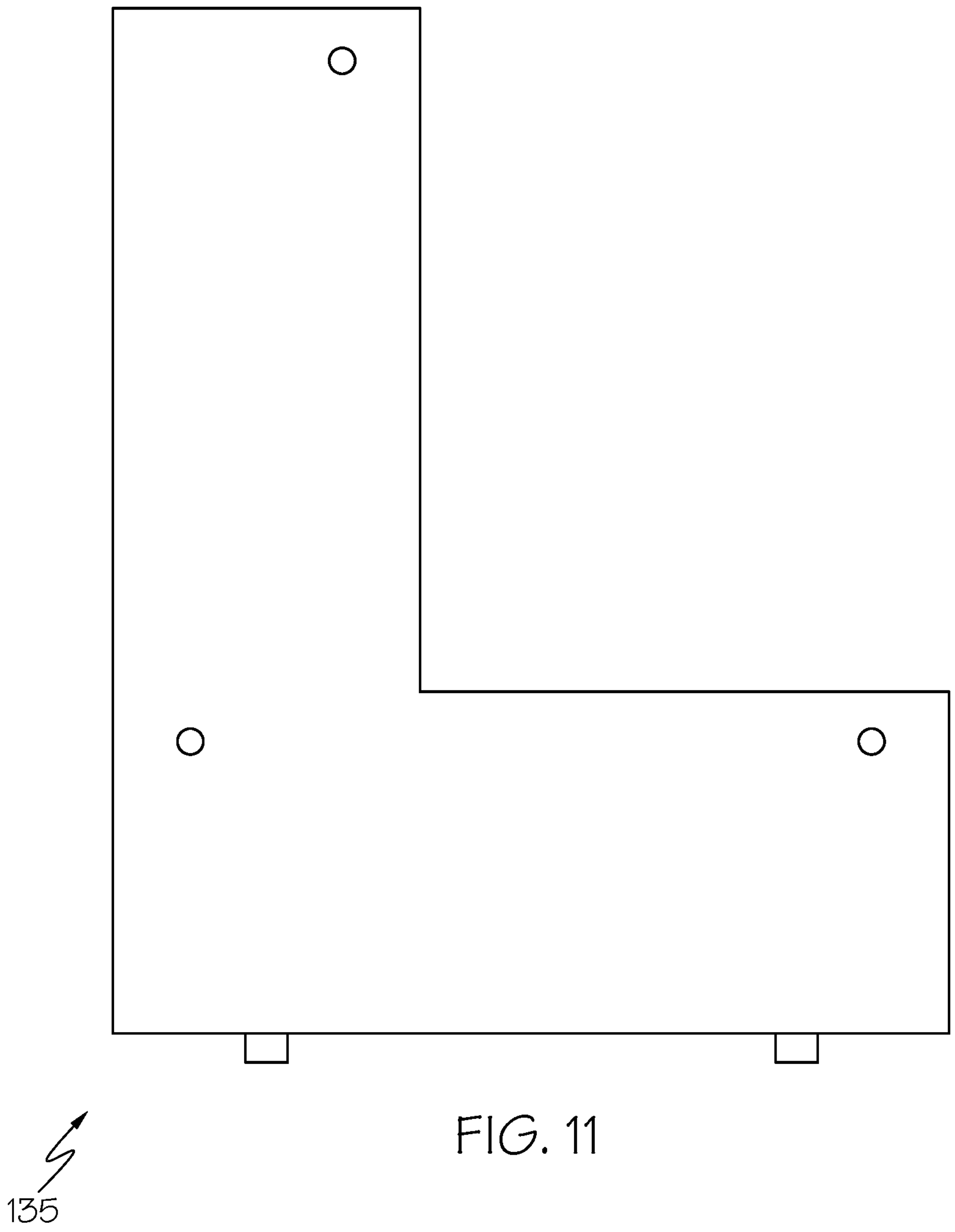
FIG. 11 is a rear view of the member of FIG. 10.

Referring to FIGS. 3 and 10, in some embodiments, mechanism 50 comprises a member 135. Member 135 comprises second member 100 and a portion 140. Portion 140 is for fastening to end walls 30, 35. In some embodiment, member 135 is a unitary body made of wood.

Further aspects of the embodiments described herein are provided by the subject matter of the following clauses:

Clause 1. A casket comprising: a container comprising four walls and a floor attached to the four walls together defining an interior, the four walls including a first end wall, a second end wall positioned opposite the first end wall, a first side wall and a second side wall positioned opposite the first side wall; a mechanism, positioned in the interior, coupled to the first end wall, the mechanism including a first rod, a second rod, and a first planar member, the first rod and second rod defining a plane substantially parallel to the first end wall, the first planar member defining a first bore and a second bore, the first rod is slidably received in the first bore, the second bore is internally threaded, the second rod is externally threaded, the second rod is threadably received in the second bore, such that rotating the second rod about a lengthwise axis of the second rod changes an elevation of the first planar member relative to the floor, wherein, the first rod, the second rod, and the first planar member are made of a combustible material.

Clause 2. The casket of clause 1, wherein the mechanism comprises a first member coupled to the first end wall at a first elevation from the floor and a second member coupled to the first end wall at a second elevation from the floor, the first rod and the second rod coupled to the first member and the second member, the planar member displaceable between the first member and the second member by rotating the second rod about the lengthwise axis of the second rod.

Clause 3. The casket of clause 1 or 2 wherein a thread on the second rod is ACME thread.

Clause 4. The casket of any of clauses 1-3, wherein the first rod is made of fiberglass.

Clause 5. The casket of any of clauses 1-4, wherein the second rod is made of glass filled nylon.

Clause 6. The casket of any of clauses 1-5, wherein the first planar member is made of polyoxymethylene.

Clause 7. The casket of any of clauses 1-6, wherein the first planar member is made of Delrin.

Clause 8. The casket of any of clauses 1-7, further comprising a second mechanism, positioned in the interior, coupled to the second end wall, the another mechanism including a third rod, a fourth rod, and a second planar member, the third rod and fourth rod defining a plane substantially parallel to the second end wall, the second planar member defining a third bore and a fourth bore, the third rod is slidably received in the third bore, the fourth bore is internally threaded, the fourth rod is externally threaded, the fourth rod is threadably received in the fourth bore, such that rotating the fourth rod about a lengthwise axis of the fourth rod changes an elevation of the second planar member relative to the floor, wherein, the third rod, the fourth rod, and the second planar member are made of a combustible material, and wherein the second mechanism comprises a third member coupled to the second end wall at a third elevation from the floor and a fourth member coupled to the second end wall at a fourth elevation from the floor, the third rod and the fourth rod coupled to the third member and the fourth member, the second planar member displaceable between the third member and the fourth member by rotating the fourth rod about a lengthwise axis of the fourth rod.

Clause 9. The casket of any of clauses 1-8, wherein the thread on the fourth rod is ACME thread, the third rod is made of fiberglass, the fourth rod is made of glass filled nylon, and the second planar member is made of polyoxymethylene.

Clause 10. The casket of any of clauses 1-9, further comprising a bed for supporting a deceased, the first planar member and the second planar member fastened to the bed, the bed located at an elevation fixed to the elevation of the first planar member and the second planar member.

In some embodiments, casket 10 comprises a mechanism 50 coupled to first end wall 30 and another one coupled to second end wall 35. First end wall 30 is located at the head board end. Second end wall 35 is located at the foot board end. Mechanism 50 at both end walls 30, 35 are substantially identical. All descriptions of features of mechanism 50 described above applies to mechanism 50 of both end walls 30, 35.

The terminology used herein is for the purpose of describing particular aspects only and is not intended to be limiting. As used herein, the singular forms a, an, and the are intended to include the plural forms, including at least one, unless the content clearly indicates otherwise. Or means and/or. As used herein, the term and/or includes any and all combinations of one or more of the associated listed items. It will be further understood that the terms comprises and/or comprising, or includes and/or including when used in this specification, specify the presence of stated features, regions, integers, steps, operations, elements, and/or components, but do not preclude the presence or addition of one or more other features, regions, integers, steps, operations, elements, components, and/or groups thereof. The term or a combination thereof means a combination including at least one of the foregoing elements.

It is noted that the terms substantially and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A casket comprising:

a container comprising four walls and a floor attached to the four walls together defining an interior, the four walls including a first end wall, a second end wall positioned opposite the first end wall, a first side wall and a second side wall positioned opposite the first side wall; and a mechanism, positioned in the interior, coupled to the first end wall, the mechanism including a first rod, a second rod, and a first planar member, the first rod and second rod defining a plane substantially parallel to the first end wall, the first planar member defining a first bore and a second bore, the first rod is slidably received in the first bore, the second bore is internally threaded, the second rod is externally threaded, the second rod is threadably received in the second bore, such that rotating the second rod about a lengthwise axis of the second rod changes an elevation of the first planar member relative to the floor, the first planar member having a thick end at the first bore and the second bore, and a thin end opposite the thick end, the first planar member having a tapered side profile extending between the thin end and the thick end, wherein, the first rod, the second rod, and the first planar member are made of a combustible material.

2. The casket of claim 1, wherein the mechanism comprises a first member coupled to the first end wall at a first elevation from the floor and a second member coupled to the first end wall at a second elevation from the floor, the first rod and the second rod coupled to the first member and the second member, the first planar member displaceable between the first member and the second member by rotating the second rod about the lengthwise axis of the second rod.

3. The casket of claim 2, wherein the first rod is made of fiberglass.

4. The casket of claim 3, wherein the second rod is made of glass filled nylon.

5. The casket of claim 4, wherein the first planar member is made of polyoxymethylene.

6. The casket of claim 5, further comprising a second mechanism, positioned in the interior, coupled to the second end wall, the second mechanism including a third rod, a fourth rod, and a second planar member, the third rod and fourth rod defining a plane substantially parallel to the second end wall, the second planar member defining a third bore and a fourth bore, the third rod is slidably received in the third bore, the fourth bore is internally threaded, the fourth rod is externally threaded, the fourth rod is threadably received in the fourth bore, such that rotating the fourth rod about a lengthwise axis of the fourth rod changes an elevation of the second planar member relative to the floor, wherein, the third rod, the fourth rod, and the second planar member are made of a combustible material, and wherein the second mechanism comprises a third member coupled to the second end wall at a third elevation from the floor and a fourth member coupled to the second end wall at a fourth elevation from the floor, the third rod and the fourth rod coupled to the third member and the fourth member, the second planar member displaceable between the third member and the fourth member by rotating the fourth rod about a lengthwise axis of the fourth rod.

7. The casket of claim 6, wherein the third rod is made of fiberglass, the fourth rod is made of glass filled nylon, and the second planar member is made of polyoxymethylene.

8. The casket of claim 7, further comprising a bed for supporting a deceased, the first planar member and the second planar member fastened to the bed, the bed located at an elevation fixed to the elevation of the first planar member and the second planar member.

* * * * *